(12) United States Patent
Lue et al.

(10) Patent No.: US 6,492,472 B2
(45) Date of Patent: Dec. 10, 2002

(54) MIXED CATALYSTS FOR USE IN A POLYMERIZATION PROCESS

(75) Inventors: Ching-Tai Lue, Houston, TX (US); Donna J. Crowther, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/730,963

(22) Filed: Dec. 5, 2000

(65) Prior Publication Data

US 2002/0010077 A1 Jan. 24, 2002

Related U.S. Application Data

(62) Division of application No. 09/079,743, filed on May 15, 1998, now Pat. No. 6,207,606.

(51) Int. Cl.$^7$ .............................. C08F 4/44; C08F 10/04
(52) U.S. Cl. ............... 526/114; 526/160; 526/348.6; 526/352; 526/943; 502/104; 502/152
(58) Field of Search .................. 526/113, 116, 526/119, 160, 943, 348.6, 351, 352, 114; 502/104, 152

(56) References Cited

U.S. PATENT DOCUMENTS

| 4,975,403 | A | | 12/1990 | Ewen |
| 5,350,817 | A | | 9/1994 | Winter et al. |
| 5,470,811 | A | | 11/1995 | Jejelowo et al. |
| 5,516,848 | A | | 5/1996 | Canich et al. |
| 5,534,473 | A | * | 7/1996 | Welch et al. ................ 502/117 |
| 5,665,818 | A | | 9/1997 | Tilston et al. |
| 5,696,045 | A | | 12/1997 | Winter et al. |
| 5,714,427 | A | * | 2/1998 | Winter et al. ................ 502/117 |
| 5,830,958 | A | * | 11/1998 | Peifer et al. ................ 526/113 |

FOREIGN PATENT DOCUMENTS

| EP | 743327 | 11/1996 |
| WO | 96/00246 | 1/1996 |

* cited by examiner

Primary Examiner—David W. Wu
Assistant Examiner—R. Harlan
(74) Attorney, Agent, or Firm—Jaimes Sher; Darrell E. Warner

(57) ABSTRACT

The present invention relates to mixed catalyst system of at least one bridged, bulky ligand metallocene-type compound, and at least one bridged, asymmetrically substituted, bulky ligand metallocene-type compound, a method of making the mixed catalyst system and to there use in a polymerization process to produce polymers having an unexpected improvement in processability.

27 Claims, 1 Drawing Sheet

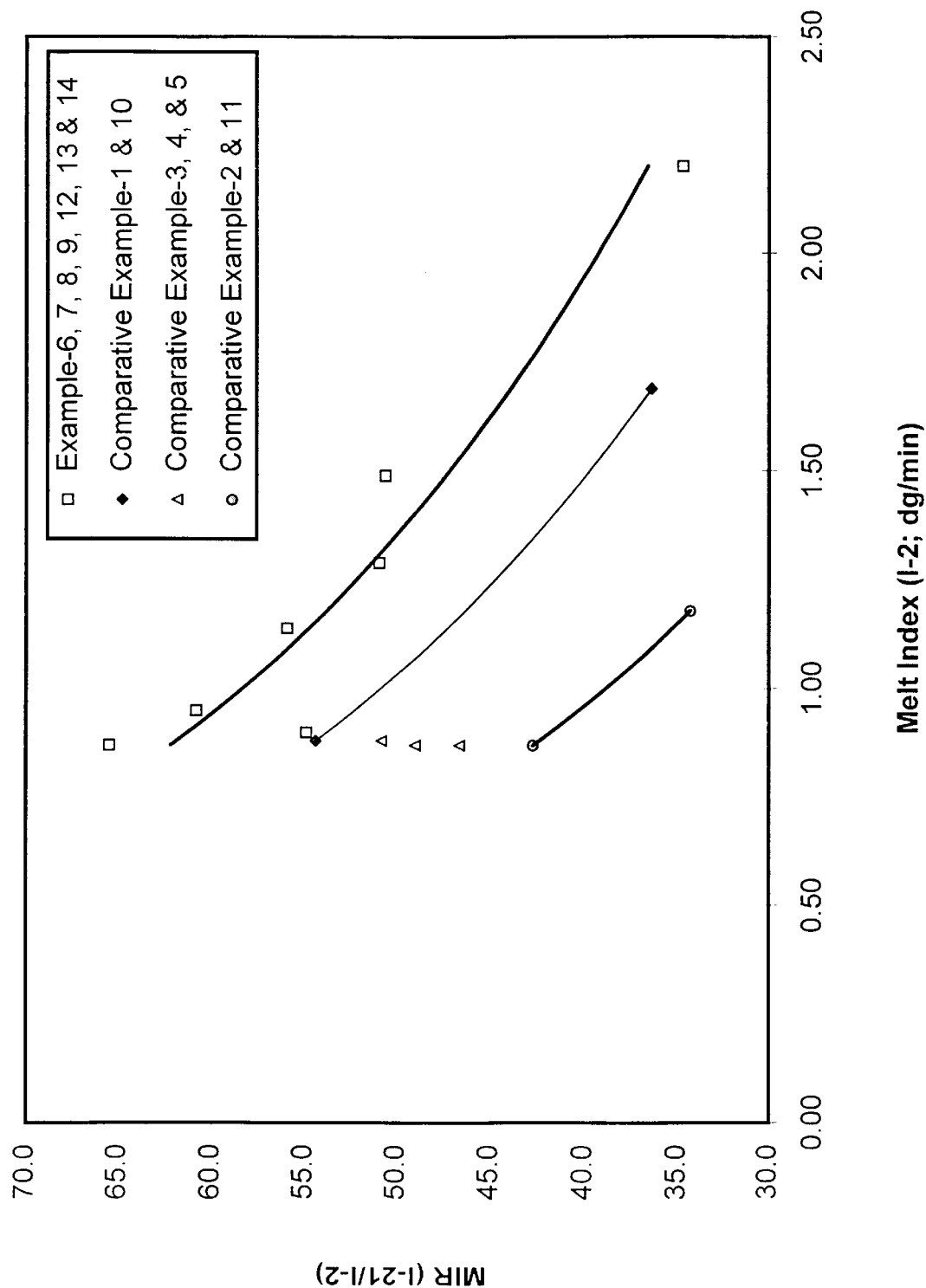

MIXED CATALYSTS FOR USE IN A POLYMERIZATION PROCESS

This application is a Divisional of U.S. Pat. application, Ser. No. 09/079,743, filed May 15, 1998, now issued as U.S. Pat No. 6,207,606.

FIELD OF THE INVENTION

The present invention relates to a mixed catalyst useful in a process for polymerizing one or more olefin(s). The mixed catalysts are bulky ligand transition metal metallocene-type catalyst compounds where at least one catalyst is a bridged, bulky ligand metallocene-type compound, and at least one catalyst is a bridged, asymmetrically substituted, bulky ligand metallocene-type compound. Polymers produced using the mixed catalyst of the invention are easier to process into end-use applications such as films or molded articles.

BACKGROUND OF THE INVENTION

The use of bulky ligand transition metal metallocene-type catalyst systems in polymerization processes to produce a diverse array of new polymers for use in a wide variety of applications and products is well known in the art. Typical bulky ligand transition metal metallocene-type compounds are generally described as containing one or more ligands capable of η-5 bonding to the transition metal atom, usually, cyclopentadienyl derived ligands or moieties, in combination with a transition metal selected from Group 4, 5 or 6 or from the lanthanide and actinide series of the Periodic Table of Elements. Exemplary of the development of these and other metallocene-type catalyst compounds and catalyst systems are described in U.S. Pat. Nos. 5,017,714, 5,055,438, 5,096, 867, 5,198,401, 5,229,478, 5,264,405, 5,278,119, 5,324,800, 5,384,299, 5,408,017, 5,491,207 and 5,621,126 all of which are herein fully incorporated by reference.

Commercial polyethylene generally has a trade-off between their processability and their physical properties. Processability is the ability to economically process and shape a polymer uniformly. Processability involves such elements as thermal stability, how easily the polymer flows, melt strength, and whether or not the extrdudate is distortion free. Linear polyethylenes, known as Linear Low Density Polyethylene (LLDPE) made with traditional Ziegler-Natta catalysts, are more difficult to process than high pressure produced low density polyethylenes (LDPE) because linear polyethylenes exhibit a higher viscosity at a higher shear region which requires more motor power, produces higher extruder pressure and prone to melt fracture at the extrusion rates of LDPE's. Linear polyethylenes also have poor bubble stability compared to LDPE due to a lower melt viscosity at low shear rates and/or lower melt strength. On the other hand, however, linear polyethylenes exhibit superior physical properties as compared to LDPE's.

In order to take advantage of the superior physical and mechanical properties of linear polyethylenes, expensive antioxidants and processing aids are added to the polymer, and extrusion equipment must be modified to achieve commercial extrusion rates.

It is also common practice in the industry to add low levels of an LDPE to a linear polyethylene to increase melt strength, to increase shear sensitivity, to increase flow at a given horse power; and to reduce the tendency to melt fracture.

A second technique to improve the processability of linear polyethylenes is to broaden the molecular weight distribution by blending two or more linear polyethylenes with significantly different molecular weights, or by changing to a polymerization catalyst that produces a polymer having a broad molecular weight distribution.

Thus, in order to obtain polymer products having improved physical properties as well as easier processing polymers, the industry has focused on the physical blending of two or more polymers in the hopes that the polymer blend will exhibit the best characteristics of its component polymers. Others have looked at using two or more reactors to produce blends in situ in the reactor or use two or more catalysts to produce the desired polymer product.

There are various publications in the art discussing mixed metallocene-type catalysts. For example, U.S. Pat. No. 4,530,914 discusses a catalyst system for producing polyethylene having a broad molecular weight distribution using two different metallocene-type catalyst compounds having different propagation and termination rate constants for ethylene polymerization. U.S. Pat. No. 4,937,299 is directed to a homogeneous catalyst system of at least two metallocene-type catalyst compounds each having different reactivity ratios for use in a single reactor to produce a polymer blend. U.S. Pat. No. 5,470,811 discusses producing polymers having improved product properties using an isomeric mixture of two or more substituted metallocene-type catalyst compounds. EP-A2-0 743 327 discuss the use of meso and racemic bridged mixed metallocene-type catalysts compounds to produce ethylene polymers having improved processability. U.S. Pat. No. 5,516,848 relates to a process for producing polypropylene using a bridged mono-cyclopentadienyl heteroatom containing compound and an unbridged, bis-cyclopentadienyl containing compound. EP-B 1-0 310 734 discusses the use of a mixed bridged bulky ligand hafnium and zirconium metallocene-type catalyst compounds to produce a polymer having broad molecular weight distribution. U.S. Pat. No. 5,696,045 describes using at least two different bridged, bulky ligand zirconium metallocene-type catalyst compounds to produce propylene polymers having a broad molecular weight distribution where one of the stereorigid zirconocenes has as a bulky ligand, an indenyl ligand having a substituent on the six-member ring. EP-B 1-516 018 describes using two different bridged bulky ligand zirconium metallocene-type catalyst compounds to produce a broad molecular weight distribution polypropylene polymer where one of the bridged metallocenes has as the bulky ligands, indenyl ligands, that are substituted in at least the two position.

Others in the art discuss using a polymerization process in which two or more polymerization reactors are joined in series, where one catalyst is used in a first reactor to produce a first polymer that is then fed into a second reactor with the same or different catalyst, typically under different reactor conditions. In this way, the resulting polymer from a series polymerization process is a combination or blend of two different polymers. These polymer blends, typically, contain a high molecular weight and a low molecular weight component. For example, U.S. Pat. No. 5,665,818 discusses using two fluidized gas phase reactors in series using a transition metal based catalyst to form an in situ polymer blend having improved extrudability. EP-B 1-0 527 221 discusses a series reactor process using metallocene-type catalyst systems for producing bimodal molecular weight distribution polymer products. However, series or multistage reactor processes are expensive and more difficult to operate.

Thus, it would be highly advantageous to have a catalyst system capable of producing an easier processing polymer having good properties, preferably in a single polymerization process.

SUMMARY OF THE INVENTION

This invention provides for a mixed bridged metallocene-type catalyst compounds of at least two different such catalyst compounds, at least one having bridged bulky ligands and the other having bridged bulky ligands that are asymmetrically substituted. The mixed bridged metallocene-type compounds of the invention together with an activator form a catalyst system useful in a polymerization process for producing polymers having improved processability.

For purposes of this patent specification and appended claims the bridged, bulky ligand metallocene-type compounds of the invention are different from the bridged, asymmetrically substituted bulky ligand metallocene-type catalyst compounds of the invention.

In another embodiment, the invention relates to a process for polymerizing olefin(s) in the presence of at least two different catalyst compounds, one being a bridged, bulky ligand transition metal metallocene-type catalyst compound and the other being a bridged, asymmetrically substituted, bulky ligand transition metal metallocene-type catalyst compound.

In yet another embodiment, the invention provides for a method for making a supported mixed catalyst of at least two different catalyst compounds, where a bridged, bulky ligand transition metal metallocene-type catalyst compound is combined with a bridged, asymmetrically substituted, bulky ligand transition metal metallocene-type catalyst compound, at least one activator, and at least one carrier. In a preferred embodiment, the bridged, bulky ligand metallocene-type catalyst compound is mixed the bridged, asymmetrically substituted, bulky ligand metallocene-type catalyst compound to form a catalyst mixture; and then contacting the catalyst mixture with a carrier.

In still yet another embodiment, the invention provides for a polymerization process using the supported mixed catalyst as described above.

BRIEF DESCRIPTION OF THE DRAWINGS

The foregoing aspects, features and advantages of the invention will become clearer and more fully understood when the following detailed description is read in conjunction with the accompanying drawing, in which:

FIG. 1 illustrates the Melt Index Ratio versus Melt Index data for the polymers produced as represented in Tables 3 and 4.

DETAILED DESCRIPTION OF THE INVENTION

Introduction

The invention is directed toward a mixed metallocene-type catalyst system for polymerizing olefin(s), where the metallocene-type catalyst system includes at least two different bridged, metallocene-type catalyst compounds, a bridged, bulky ligand transition metal metallocene-type catalyst compound and a bridged, asymmetrically substituted bulky ligand, transition metal metallocene-type catalyst compound. The metallocene-type catalyst compounds are bridged in that there is a structural bridge imparting stereorigidity to the catalyst compounds. Also, the substitutions on one of the bridged, bulky ligand transition metal metallocene-type catalyst compounds is in an asymmetrical configuration on the bulky ligand.

It has been discovered that the polymer produced using the mixed catalyst of the invention has better processability than the polymers produced using a bridged, bulky ligand metallocene-type catalyst by itself and the polymer produced using the bridged, asymmetrically substituted bulky ligand metallocene-type catalyst by itself. Furthermore, blending these two separately produced and different polymers does not result in a polymer blend having the processability characteristics of the polymer produced using the mixed catalyst of the invention. It has been surprisingly discovered that using a bridged bulky ligand metallocene-type catalyst compound and a bridged, asymmetrically substituted bulky ligand metallocene-type catalyst compound an improved polymer product is produced. In fact, the product produced using the mixed metallocene-type catalysts of the invention exhibit a melt index ratio greater than that of either of the separately produced polymers or blends of the separately produce polymers.

In particular, it has been surprisingly discovered that the mixed catalyst of the invention produces a polymer product that is easier to process. In this invention, a synergistic effect is observed in the polymer's high Melt Index Ratio (MIR), a characteristic of an easier processing polymer. The desire for a combination of low viscosity at high deformation (shear) rate region and high viscosity at low deformation (shear and elongation) rate region means a high shear thinning material is preferred. Shear thinning is the dependence of melt viscosity on the deformation (shear) rate. In industry, shear thinning of a polymer is estimated comparing flow rates under two different pressures. MIR ($I_{21}/I_2$) is the ratio of $I_{21}$ as described in ASTM-D-1238-F and $I_{21}$ as described in ASTM-D-1238-E. $I_2$ is well known in the art as the equivalent to Melt Index (MI). $I_{21}$ is also known as high load melt index (HLMI).

Catalyst Components and Catalyst Systems

Generally, bulky ligand transition metallocene-type catalyst compounds include half and full sandwhich compounds having one or more bulky ligands including cyclopentadienyl structures or other similar functioning structure such as pentadiene, cyclooctatetraendiyl and imides. The bulky ligands are capable of η-5 bonding to a transition metal atom, for example from Group 4, 5 and 6 of the Periodic Table of Elements. Non-limiting examples of catalyst components and catalyst systems are discussed in for example, U.S. Pat. Nos. 4,530,914, 4,871,705, 4,937,299, 5,124,418, 5,017,714, 5,120,867, 5,210,352, 5,278,264, 5,278,119, 5,304,614, 5,324,800, 5,347,025, 5,350,723, 5,391,790, 5,391,789, 5,399,636, 5,539,124, 5,455,366, 5,534,473, 5,684,098, 5,693,730, 5,698,634, 5,710,297, 5,712,354, 5,714,427, 5,714,555, 5,728,641 and 5,728,839 all of which are herein fully incorporated by reference. Also, the disclosures of European publications EP-A-0 591 756, EP-A-0 520 732, EP-A- 0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455 and WO 98/06759 are all herein fully incorporated by reference for purposes of describing typical bulky ligand transition metal metallocene-type catalyst compounds and catalyst systems.

Bridged, Bulky Ligand Metallocene-Type Catalyst Compounds

Typically, bridged, bulky ligand metallocene-type catalyst compounds of the invention are represented by the formula:

$$AL^AL^BMQ \qquad (I)$$

where M is a metal from the Periodic Table of the Elements and may be a Group 3 to 10 metal, preferably, a Group 4, 5 or 6 transition metal or a metal from the lanthanide or actinide series, more preferably M is a transition metal from Group 4, even more preferably zirconium, hafnium or titanium. $L^A$ and $L^B$ are bulky ligands that includes cyclopentadienyl derived ligands or substituted cyclopentadienyl derived or heteroatom substituted cyclopentadienyl derived ligands or hydrocarbyl substituted cyclopentadienyl derived ligands or moieties such as indenyl ligands, a benzindenyl ligands or a fluorenyl ligands, an octahydrofluorenyl ligands, a cyclooctatetraendiyl ligands, an azenyl ligands and the like, including hydrogenated versions thereof. Also, $L^A$ and $L^B$ may be any other ligand structure capable of η-5 bonding to M, for example $L^A$ and $L^B$ may comprises one or more heteroatoms, for example, nitrogen, silicon, germanium, and phosphorous, in combination with carbon atoms to form a cyclic structure, for example a heterocyclopentadienyl ancillary ligand. Further, each of $L^A$ and $L^B$ may also be other types of bulky ligands including but not limited to bulky amides, phosphides, alkoxides, aryloxides, imides, carbolides, borollides, porphyrins, phthalocyanines, corrins and other polyazomacrocycles. Each $L^A$ and $L^B$ may be the same or different type of bulky ligand that is π-bonded to M.

Each $L^A$ and $L^B$ may be substituted with a combination of substituent groups R. Non-limiting examples of substituent groups R include hydrogen or linear, branched, alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, iso propyl etc. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis (difluoromethyl)silyl, bromomethyldimethylgermyl and the like; and disubstituted boron radicals including dimethylboron for example; and disubstituted pnictogen radicals including dimethylamino, dimethylphosphino, diphenylamino, methylphenylphosphino, chalcogen radicals including methoxy, ethoxy, propoxy, phenoxy, methylsulfide, ethylsulfide. Non-hydrogen substituents R include the atoms carbon, silicon, nitrogen, oxygen, tin, germanium and the like including olefins such as but not limited to olefinically unsaturated substituents including vinyl-terminated ligands, for example but-3-enyl or hexene-5. Also, two adjacent R groups are joined to form a ring structure having from 4 to 20 atoms selected from carbon, nitrogen, oxygen, phosphorous, silicon, germanium, boron or a combination thereof.

Other ligands may be bonded to the transition metal, such as a leaving group Q. Each Q may be an independently monoanionic labile ligand(s) having a sigma-bond to M. Each Q may be a neutral radical or a radical in a 2 oxidation state. Non-limiting examples of Q include weak bases such as amines, phosphines, ether, carboxylates, dienes, hydrocarbyl radicals having from 1 to 20 carbon atoms, hydrides or halogens and the like. Other examples of Q radicals include those substituents for R as described above and including cyclohexyl, heptyl, tolyl, trifluromethyl, tetramethylene and pentamethylene, methylidene, methoxy, ethyoxy, propoxy, phenoxy, bis(N-methylanilide), dimethylamide, dimethylphosphide radicals and the like.

In addition, the bridged, bulky ligand metallocene-type catalyst compounds of the invention are those where $L^A$ and $L^B$ are bridged to each other by a bridging group A. Non-limiting examples of bridging group A include bridging radicals of at least one Group 14 atom, such as but not limited to carbon, oxygen, nitrogen, silicon, germanium and tin, preferably carbon, silicon and germanium, most preferably silicon. Other non-limiting examples of bridging groups A include dimethylsilyl, diethylsilyl, methylethylsilyl, trifluoromethylbutylsilyl, bis (trifluoromethyl)silyl, di-n-butylsilyl, silylcyclobutyl, di-i-propylsilyl, di-cyclohexylsilyl, di-phenylsilyl, cyclohexylphenylsilyl, t-butylcyclohexylsilyl, di-t-butylphenylsilyl, di(p-tolyl)silyl, dimethylgermyl, diethylgermyl, methylene, dimethylmethylene, diphenylmethylene, ethylene, 1–2-dimethylethylene, 1,2-diphenylethylene, 1,1,2,2-tetramethylethylene, dimethylmethylenedimethylsilyl, methylenediphenylgermyl, methylamine, phenylamine, cyclohexylamine, methylphosphine, phenylphosphine, cyclohexylphosphine and the like.

In one embodiment, the bridged, bulky ligand metallocene-type catalyst compound of the invention is represented by the formula:

$(C_5H_{4-d}R_d)A(C_5H_{4-d}R_d)MQg_{-2}$ (II)

wherein M is a Group 4, 5, 6 transition metal, $(C_5H_{4-d}R_d)$ is an unsubstituted or substituted cyclopentadienyl derived bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of carbon, germanium, silicon, tin, phosphorous or nitrogen atom containing radical bridging two $(C_5H_{4-d}R_d)$rings; more particularly, non-limiting examples of A may be represented by $R'_2C$, $R'_2Si$, $R'_2Si$ $R'_2Si$ $R'_2Si$ $R'_2C$, $R'_2Ge$, $R'_2Ge$, $R'_2Si$ $R'_2Ge$, R'GeR $R'_2C$, R'N, R'P, $R'_2C$ R'N, $R'_2C$ R'P, $R'_2Si$ R'N, $R'_2Si$ R'P, $R'_2GeR'N$, $R'_2Ge$ R'P, where R' is independently, a radical group which is hydride, $C_{1-30}$ hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen; each Q which can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclometallated hydrocarbyl ligand or other divalent anionic chelating ligand, where g is an integer corresponding to the formal oxidation state of M, and d is an integer selected from the 0, 1, 2, 3 or 4 and denoting the degree of substitution.

The bridged, bulky ligand metallocene-type compounds are those where the R substituents on the bulky ligands $L^A$, $L^B$, $(C_5H_{4-d}R_d)$ of formulas (I) and (II) are substituted with the same number of substituents on each of the bulky ligands. For purposes of further clarification, the following list of non-limiting examples of bridged, bulky ligand metallocene-type catalyst compounds of the invention, are provided, and include, dimethylsilyl-bis (cyclopentadienyl)

zirconium dichloride, dimethylsilyl bis-(tetrahydroindenyl) zirconium dichloride, dimethylsilyl bis (indenyl) zirconium dichloride, dimethylsilyl bis (2-methyl-indenyl) zirconium dichloride, dimethylsilyl bis(1,2-di-methyl-cyclopentadienyl) zirconium dichloride, and any of the above catalyst compounds where the dimethylsilyl is an A as defined above, the methyl is an R as defined above, the bulky ligand (cyclopentadienyl, tetrahydroindenyl, indenyl) is as defined above for $L^A$, $L^B$, $(C_5H_{4-d}R_d)$ the zirconium transition metal is as defined above for M, and the dichloride is as defined above for Q.

In a preferred embodiment of the bridged bulky ligand metallocene-type compound of the invention, the bulky ligand $(C_5H_{4-d}R_d)$ of formula (II) above is such that the integer d for each bulky ligand is the same integer from 0 to 4. In one embodiment, preferably, d is an integer from 0 to 3, more preferably from 0 to 2 and most preferably d is 2.

In a preferred embodiment of the bridged, bulky ligand metallocene-type catalyst compounds of the invention of any of the combinations above, A in formula (I) and (II) is a radical of one or more silicon atoms and the R substituents on each bulky ligand is hydrogen or the same number and kind of hydrocarbyl radical having from 1 to 30 carbon atoms, preferably 1 to 10, more preferably 1 to 5, and most preferably the R substituents are all hydrogen.

In another preferred embodiment of the bridged, bulky ligand metallocene-type catalyst compounds include bridged, symmetrically substituted bulky ligand metallocene-type compounds in terms of the type of substituent(s) R substituted on the bulky ligand.

Bridged, Asymmetrically Substituted Bulky Ligand Metallocene-Type Catalyst Compounds The bridged, asymmetrically substituted bulky ligand metallocene-type catalyst compounds of the invention are represented by the above formula (I) where the $L^A$ and $L^B$ bulky ligands are asymmetrically substituted in terms of additional substituents or types of substituents, and/or unbalanced in terms of the number of additional substituents on the bulky ligands or the bulky ligands themselves are different. In a preferred embodiment, the bulky ligands are the same; however, the substituents R on each of $L^A$ and $L^B$ are different in number. The number of R substituents may vary depending on the bulky ligand, however, preferably there are in the range of from 1 to 7 R substituent(s) between the two bulky ligands $L^A$ and $L^B$. The definitions for $L^A$ and $L^B$ and R are as described above.

In another preferred embodiment, the bridged, asymmetrically substituted bulky ligand metallocene-type catalyst compounds of the invention are represented by the above described formula (II) where the two bulky ligands $(C_5H_{4-d}R_d)$ as described above are different in terms of the number of R substituent groups on each of the bulky ligands $(C_5H_{4-d}R_d)$.

In one embodiment of the invention, the bridged, asymmetrically substituted bulky ligand metallocene-type catalyst compounds of the invention may be represented by the above formula (II) where the value for d is different for each bulky ligand $(C_5H_{4-d}R_d)$, more particularly and depending on the bulky ligand, d is an integer from 0, 1, 2, 3 or 4 as defined above, where the integer d of one of the bulky ligands $(C_5H_{4-d}R_d)$ is different from the other. Thus, in one embodiment of the invention where one of the bulky ligands $(C_5H_{4-d}R_d)$ of formula (III) above is replaced with $(C_5H_{4-d}R_d)$, d and e are integers from 0 to 4 and d and e are not the same integer.

In another embodiment, where the above formula (II) is replaced with formula (III) represented by $(C_5H_{4-d}R_d)A$ $(C_5H_{4-e}R_e)MQg_{-2}$ where A, R, Q, M and g are as defined above in formula (II); however, in formula (III) d and e are integers from 0 to 4, the sum of d and e equals 1 through 8, preferably the sum of d and e is 3 to 8, more preferably 3 to 5.

In another embodiment of the bridged, asymmetrically substituted bulky ligand metallocene-type catalyst compounds of the invention represented by formula (III), d is equal to 4 and e is an integer from 0 to 3, preferably e is an integer from 0 to 2, and in the most preferred embodiment, e is 1.

In a preferred embodiment of the bridged, asymmetrically substituted bulky ligand metallocene-type catalyst compounds of the invention of any of the combinations above, A in formula (I) and (II) and (III) is a radical of one or more silicon atoms and the R substituents on each bulky ligand are the same hydrocarbyl radical having from 1 to 30 carbon atoms, preferably 1 to 10, more preferably 1 to 5, and even more preferably the R substituents are selected from one or more of methyl, ethyl, propyl and iso-propyl, and most preferably methyl, most preferred is where the R substituents are the same type of radical on each bulky ligand.

Non-limiting examples of bridged, asymmetrically substituted bulky ligand metallocene-type catalyst compounds of the invention include dimethylsilyl (1,2,3,4-tetramethyl cyclopentadienyl)(cyclopentadienyl)zirconium dichloride, dimethylsilyl (1,2,3,4-tetramethyl cyclopentadienyl)(1 ,2,3-trimethyl-cyclopentadienyl)zirconium dichloride, dimethylsilyl (1,2,3,4-tetramethyl cyclopentadienyl)(1,2-dimethyl-cyclopentadienyl)zirconium dichloride, dimethylsilyl (1,2, 3,4-tetramethyl-cyclopentadienyl)(2-methylcyclopentadienyl) zirconium dichloride, dimethylsilyl (cyclopentadienyl)(indenyl) zirconium dichloride, dimethylsilyl (2-methylindenyl)(fluorenyl) zirconium dichloride, diphenylsilyl (1,2,3,4-tetramethyl-cyclopentadienyl) (3-propylcyclopentadienyl) zirconium dichloride, dimethylsilyl (1,2,3,4-tetramethyl cyclopentadienyl) (3-t-butylcyclopentadienyl)zirconium dichloride, dimethylgermyl (1,2-dimethyl cyclopentadienyl) (3-isopropylcyclopentadienyl) zirconium dichloride, dimethylsilyl (1,2,3,4-tetramethyl-cyclopentadienyl)(3-methylcyclopentadienyl) zirconium dichloride, and any of the above catalyst compounds where the dimethylsilyl, dimethylgermyl and the diphenyl is an A as defined above, the methyl, t-butyl, propyl and isopropyl substituents is an R as defined above, the bulky ligand (cyclopentadienyl, indenyl, fluorenyl) is as defined above for $L^A$, $L^B$, $(C_5H_{4-d}R_d)$ and $(C_5H_{4-e}R_e)$, the zirconium transition metal is as defined above for M, the dichloride is as defined above for Q.

It is also contemplated that in one embodiment, mixed catalysts of the invention, the bridged, bulky ligand metallocene-type compound and the bridged, asymmetrically substituted, bulky ligand metallocene-type compound may include their structural or optical isomers and mixtures thereof. However, for the purposes this patent specification and appended claims a single, bridged, asymmetrically substituted bulky ligand metallocene-type compound having a racemic and/or meso isomer does not, itself, constitute at least two different bridged, metallocene-type catalyst compounds.

In one specific embodiment, the mixed catalyst of the invention is composed of at least one chiral, more preferably two chiral, bridged metallocene-type compounds of the invention where the bridged, bulky ligand metallocene-type compound of the invention is not substituted in the two position on the bulky ligand, more preferably is not a bridged, a 2-methyl-indenyl ligand.

In an embodiment of the invention the mixed catalyst has from 1 to 99 mole percent of the bridged, bulky ligand metallocene-type catalyst compound to from 99 to 1 mole percent of the bridged, asymmetrically substituted bulky ligand metallocene-type catalyst compound based on the total moles of the bridged, bulky ligand metallocene-type catalyst compound and the bridged, asymmetrically substituted, bulky ligand metallocene-type compound.

In a more preferred mole percent range the mixed catalyst of the invention has from about 2 to about 98 mole percent of the bridged, bulky ligand metallocene-type catalyst compound to from about 98 to about 2 moles of the bridged, asymmetrically substituted bulky ligand metallocene-type catalyst compound, more preferably from about 95 to about 5 mole percent of the bridged, bulky ligand metallocene-type catalyst compound to from about 5 to about 95 mole percent of the bridged, asymmetrically substituted bulky ligand metallocene-type catalyst compound, more preferably from about 90 to about 10 mole percent of the bridged, bulky ligand metallocene-type catalyst compound to from about 10 to about 90 mole percent of the bridged, asymmetrically substituted bulky ligand metallocene-type catalyst compound.

In another embodiment, the mole percent range of the mixed catalyst of the invention is from about 85 to about 15 mole percent of the bridged, bulky ligand metallocene- type catalyst compound to from about 15 to about 85 mole percent of the bridged, asymmetrically substituted bulky ligand metallocene-type catalyst compound.

In the most preferred embodiment, the mole percent range of the mixed catalyst of the invention has from about 25 to about 75 mole percent of the bridged, bulky ligand metallocene-type catalyst compound to from about 75 to about 25 mole percent of the bridged, asymmetrically substituted bulky ligand metallocene-type catalyst compound.

Activator and Activation Methods

The above described bridged, bulky ligand metallocene-type catalyst compounds and the bridged, asymmetrically substituted, bulky ligand metallocene-type catalyst compounds of the invention are typically activated in various ways to yield catalyst compounds having a vacant coordination site that will coordinate, insert, and polymerize olefins.

For the purposes of this patent specification and appended claims, the term "activator" is defined to be any compound or component or method which can activate any of the bridged, bulky ligand metallocene-type catalyst compounds and the bridged, asymmetrically substituted, bulky ligand metallocene-type catalyst compounds of the invention as described above. Non-limiting activators, for example may include a Lewis acid or a non-coordinating ionic activator or ionizing activator or any other compound that can convert a neutral bulky ligand metallocene-type catalyst component to a bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor that would ionize the neutral metallocene compound.

There are a variety of methods for preparing alumoxane and modified alumoxanes, non-limiting examples of which are described in U.S. Pat. No. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, now abandoned all of which are herein fully incorporated by reference.

Other activators include those described in PCT publication WO 98/07515 such as tris (2, 2', 2"-nonafluorobiphenyl) fluoroaluminate, which publication is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activating methods for the purposes of rendering the neutral metallocene-type catalyst compound or precursor to a metallocene-type cation capable of polymerizing olefins.

It is further contemplated by the invention that other catalysts can be combined with the mixed bridged, bulky ligand and asymmetrically substituted bulky ligand, metallocene-type catalyst compounds of the invention. For example, see U.S. Pat. Nos. 4,937,299, 4,935,474, 5,281, 679, 5,359,015, 5,470,811, and 5,719,241 all of which are herein fully incorporated herein reference.

One such other catalyst useful in combination with the mixed bridged catalysts of the invention may be metallocene-type catalyst compounds that are known as bis-metallocene-type compounds as described in U.S. Pat. No. 5,324,800, which is fully incorporated herein by reference. Other metallocene-type catalysts that may be combined with the mixed bridged catalysts of the invention include monocyclopentadienyl heteroatom containing transition metal metallocene-type compounds. These types of catalyst systems are described in, for example, PCT publication WO 92/00333, WO 94/07928, WO 91/ 04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

Other catalysts that be combined with the mixed bridged catalysts of the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401 and 5,723,398 and PCT publications WO 93/08221, WO 93/08199, WO 95/07140, WO 98/11144 and European publications EP-A-0 578 838, EP-A-0 638 595, EP-B-0 513 380 and EP-A1-0 816 372, all of which are herein fully incorporated by reference.

In another embodiment of the invention the mixed bridged catalysts of the invention may be used in combination with a non-metallocene or traditional Ziegler-Natta catalyst (excludes a cyclopentadienyl containing moiety) or catalyst system, or chromium based catalysts or catalyst systems, non-limiting examples are described in U.S. Pat. Nos. 4,159,965, 4,325,837, 4,701,432, 5,124,418, 5,077,255, 5,183,867, 5,391,660, 5,395,810, 5,691,264 and 5,723,399 and PCT Publication WO 96/23010 published Aug. 1, 1996 all of which are herein fully incorporated by reference.

It is also within the scope of this invention that the above described complexes can be combined with one or more of the catalyst compounds represented by formula (I) and (II), with one or more activators, and optionally with one or more of the support materials using one of the support methods described below.

The mixed bridged, bulky ligand and asymmetrically substituted, bulky ligand metallocene-type catalyst systems of the invention may be made and used in a variety of different ways as described below.

In one embodiment the mixed bridged catalyst of the invention is used in an unsupported form, preferably in a liquid form such as described in U.S. Pat. Nos. 5,317,036 and 5,693,727 and European publication EP-A-0 593 083, all of which are herein incorporated by reference. The catalyst in liquid form can be fed to a reactor as described in PCT publication WO 97/46599, which is fully incorporated herein by reference.

In another preferred embodiment, the mixed bridged metallocene-type catalyst systems of the invention may be used in a supported form, for example deposited on, contacted with, or incorporated within, a support material. The terms "carrier" or "support" are interchangeable and can be any support material, preferably a porous support material, for example, talc, inorganic oxides, inorganic chlorides, and magnesium chloride, and resinous support materials such as polystyrene or a functionalized organic support or crosslinked organic support such as polystyrene divinyl benzene polyolefins or polymeric compounds, or any other organic or inorganic support material and the like, or mixtures thereof.

The preferred support materials are inorganic oxide materials, which include those of Groups 2, 3, 4, 5, 13 or 14 metal oxides. In a preferred embodiment, the mixed metallocene-type catalyst support materials include silica, alumina, silica-alumina, and mixtures thereof. Other inorganic oxides that may be employed either alone or in combination with the silica, alumina or silica-alumina, and magnesia, titania, zirconia, montmorillonite and the like or combination thereof, for example, silica-chromium, silica-titania.

It is preferred that the carrier of the mixed bridge metallocene-type catalysts of this invention, preferably an inorganic oxide, has a surface area in the range of from about 10 to about 700 $m^2/g$, pore volume in the range of from about 0.1 to about 4.0 cc/g and average particle size in the range of from about 10 to about 500 $\mu$m. More preferably, the surface area is in the range of from about 50 to about 500 $m^2/g$, pore volume of from about 0.5 to about 3.5 cc/g and average particle size of from about 20 to about 200 $\mu$m. Most preferably the surface area range is from about 100 to about 400 $m^2/g$, pore volume from about 0.8 to about 3.0 cc/g and average particle size is from about 20 to about 100 $\mu$m. The average pore size of the carrier of the invention typically has pore size in the range of from 10 to 1 Å, preferably 50 to about 500 Å, and most preferably 75 to about 350 Å.

Examples of supporting the mixed bridged metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402 and 5,731,261 and U.S. Application Ser. Nos. 271,598 filed Jul. 7, 1994 now U.S. Pat. 5,468,702 and 788,736 filed Jan. 23, 1997 now U.S. Pat. 6,090,740 and PCT publications WO 95/32995, WO 95/14044, WO 96/06187 and WO 97/02297 all of which are herein fully incorporated by reference.

It is contemplated that the mixed bridged metallocene-type catalyst compounds of the invention may be deposited on the same or separate supports together with an activator, or the activator may be used in an unsupported form, or may be deposited on a support different from the supported mixed bridged metallocene-type catalyst compounds of the invention, or any combination thereof.

In another embodiment, the mixed bridged metallocene-type catalyst system of the invention contains a polymer bound ligand as described in U.S. Pat. No. 5,473,202 which is herein fully incorporated by reference. In one embodiment the mixed bridged metallocene-type catalyst system of the invention is spray dried as described in U.S. Pat. No. 5,648,310 which is fully incorporated herein by reference. In an embodiment the support used with the mixed bridged metallocene-type catalyst system of the invention is functionalized as described in European publication EP-A-0 802 203, or at least one substituent or leaving group is selected as described in U.S. Pat. No. 5,688,880, both of which are herein fully incorporated by reference.

In one embodiment of the process of the invention, olefin(s), preferably $C_2$ to $C_{30}$ olefin(s) or alpha-olefin(s), preferably ethylene or propylene or combinations thereof are prepolymerized in the presence of the mixed bridged metallocene-type catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For examples of prepolymerization procedures, see U.S. Pat. Nos. 4,923,833, 4,921,825, 5,283,278 and 5,705,578 and European publication EP-B-0279 863 and PCT Publication WO 97/44371 all of which are herein fully incorporated by reference.

In another embodiment, the invention provides for a supported mixed bridged metallocene-type catalyst system that includes an antistatic agent or surface modifier, for example, those described in U.S. Pat. No. 5,283,278 and PCT publication WO 96/11960 which are herein fully incorporated by reference. Non-limiting examples of antistatic agents and surface modifiers include alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported mixed bridged metallocene-type catalyst system of the invention, however, it is preferred that it is added after the supported mixed catalyst system of the invention is formed, in either a slurry or dried state.

A preferred method for producing the mixed bridged metallocene-type catalyst system catalyst of the invention is described below and can be found in U.S. application Ser. Nos. 265,533, filed Jun. 24, 1994 now abandoned and 265,532, filed Jun. 24, 1994 now abandond and PCT publications WO 96/00245 and WO 96/00243 both published Jan. 4, 1996, all of which are herein fully incorporated by reference.

In a preferred embodiment, the mixed bridged, metallocene-type catalyst compound is slurried in a liquid to form a metallocene solution and a separate solution is formed containing an activator and a liquid. The liquid can be any compatible solvent or other liquid capable of forming a solution or the like with at least one of the bridged, metallocene-type catalyst compounds of the invention and/ or at least one activator. In the preferred embodiment the liquid is a cyclic aliphatic or aromatic hydrocarbon, most preferably toluene. The mixed bridged metallocene-type catalyst compound and activator solutions are mixed together and added to a porous support or the porous support is added to the solutions such that the total volume of the mixed bridged, metallocene-type catalyst compound solution and the activator solution or the mixed bridged, metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total Porosity and Particle Density of Fluid Catalysts By Liquid Titration,* Vol. 28, No. 3, Analytical Chemistry 332–334 (March, 1956).

The mole ratio of the metal of the activator component to the metal of the mixed bridged, metallocene-type catalyst compounds are in the range of ratios between 0.3:1 to 1000:1, preferably 20:1 to 800:1, and most preferably 50:1 to 500:1. Where the activator is an aluminum-free ionizing activator such as those based on the anion tetrakis (pentafluorophenyl)boron, the mole ratio of the metal of the activator component to the transition metal component is preferably in the range of ratios between 0.3:1 to 3:1.

In another embodiment, the mixed bridged metallocene-type catalyst compounds loadings in millimoles (mmoles) of metallocene-type catalyst compounds to weight of the supported mixed metallocene-type catalyst compounds in grams (g) is in the range of from about 0.001 to about 2.0 mmoles of metallocenes per g of support material, preferably from about 0.005 to about 1.0, more preferably from about 0.005 to 0.5 and most preferably from about 0.01 to 0.05.

In a preferred embodiment for making the mixed bridged metallocene-type catalyst systems of the invention, the bridged, bulky ligand metallocene-type catalyst compound and the bridged, asymmetrically substituted bulky ligand metallocene-type catalyst compound are codeposited on the same carrier. In a more preferable method the mixed bridged metallocene-type catalyst compounds are combined with an activator prior to codepositing them onto a carrier. It is contemplated in the method of the invention that each of the bridged, metallocene-type catalyst compounds may be contacted with the same or different or a combination of activators to produce a supported mixed bridged metallocene-type catalyst system followed then by depositing the supported catalyst system onto the carrier. It is also contemplated, however lesser preferred, to prepare a first supported catalyst system of a bridged, bulky ligand metallocene-type catalyst compound and to prepare a second catalyst system, preferably a supported catalyst system of a bridged, asymmetrically substituted bulky ligand metallocene-type catalyst compound such that the first and second supported catalyst systems are then combined to form a mixed supported catalysts system of the invention.

Polymerization Process of the Invention

The mixed bridged metallocene-type catalyst compounds and catalyst systems of the invention described above are suitable for use in any polymerization process. The polymerization process of the invention includes a solution, gas or slurry process (including a high pressure process) or a combination thereof, more preferably a gas or slurry phase process, and most preferably a gas phase process in a single reactor.

In an embodiment, this invention is directed toward the solution, slurry or gas phase polymerization or copolymerization reactions involving the polymerization of one or more of the olefin monomer(s) having from 2 to 30 carbon atoms, preferably 2 to 12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, and most preferably from 4 to 8 carbon atoms.

In another embodiment ethylene or propylene is polymerized with at least two different comonomers to form a terpolymer; the preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/ propylene/butene-1, propylene/ethylene/hexene-1, ethylene/ propylene/norbornene and the like.

In the most preferred embodiment the process of the invention relates to the polymerization of ethylene and at least one comonomer having from 4 to 8 carbon atoms in the presence of a bridged, bulky ligand metallocene-type catalyst compound and a bridged, asymmetrically substituted bulky ligand metallocene-type catalyst compound and an activator, optionally supported on a carrier. Particularly, the comonomers are butene-1, 4-methyl-pentene-1, hexene-1 and octene-1, the most preferred being hexene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

Examples of solution processes are described in U.S. Pat. Nos. 4,271,060 and 5,589,555, which are fully incorporated herein by reference A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

Polymer Product of the Invention

The polymers produced by the process of the invention can be used in a wide variety of products and end-use applications. The polymers typically have a density in the range of from 0.86g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.900 g/cc, preferably greater than 0.910 g/cc, and most preferably greater than 0.915 g/cc. In another embodiment, the polymers produced by the mixed catalyst system of the invention have a density in the range of from 0.910 g/cc to about 0.930 g/cc, most preferably in the range of from 0.915 g/cc to about 0.930 g/cc.

The polymers of the invention typically may have a relatively narrow molecular weight distribution, a weight average molecular weight to number average molecular weight ($M_w/M_n$) of greater than 1.5 to about 10, particularly greater than 2 to about 8, more preferably greater than about 4 to less than 8.

Also, the polymers of the invention typically have a narrow composition distribution as measured by Composition Distribution Breadth Index (CDBI). Further details of determining the CDBI of a copolymer are known to those skilled in the art. See, for example, PCT Pat. Application WO 93/03093, published Feb. 18, 1993 which is fully incorporated herein by reference.

The polymers of the invention in one embodiment have CDBI's generally in the range of greater than 50% to 99%, preferably in the range of 55% to 85%, and more preferably 60% to 80%, even more preferably greater than 60%, still even more preferably greater than 65%.

The polymers of the present invention in one embodiment have a melt index (MI) or ($I_2$) as measured by ASTM-D-1238-E in the range from 0.01 dg/min to 1000 dg/min, more preferably from about 0.05 dg/min to about 200 dg/min, even more preferably from about 0.1 dg/min to about 50 dg/min, and most preferably from about 0.3 dg/min to about 20 dg/min.

The polymers of the invention in one embodiment have a melt index ratio ($I_2/I_2$) as measured above of from preferably greater than 50, more preferably greater than 55, and most preferably greater than 60.

The polymers of the invention in another embodiment satisfy the following formula MIR≧0.95[58.352–63.498 (log(MI))], where MI is the melt index as measured above. In another embodiment, the polymers of the invention have a density in the range of from 0.85 g/cc to about 0.950 g/cc and satisfy the following formula MIR≧[58.352–63.498(log (MI))], where MI is the melt index as measured above. It is understood that the MIR in either equation above is not a negative number, and it is preferred that the MI in either equation is preferably less than about 8 dg/min, more preferably in the range of from 0.01 dg/min to about 5 dg/min and most preferably in the range of from 0.1 dg/min to about 3 dg/min.

Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The properties of the polymer were determined by the following test methods:

Density is measured in accordance with ASTM-D-1238.

MWD, or polydispersity, is a well-known characteristic of polymers. MWD is generally described as the ratio of the weight average molecular weight ($M_w$) to the number average molecular weight (Mn). The ratio of Mw/Mn can be measured by gel permeation chromatography techniques well known in the art.

In all the Examples below the methylalumoxane (MAO) used was a 30 weight percent MAO solution in toluene (typically 13.5 wt % Aluminum and 28.2 wt % MAO by NMR) available from Albemarle Corporation, Baton Rouge, Louisiana, the Davision 948 silica dehydrated to 600 ° C. available from W. R. Grace, Davison Chemical Division, Baltimore, Md.

The bridged, bulky ligand metallocene-type compound, dimethylsilyl bis (tetrahydroindenyl) zirconium dichloride ($Me_2Si(C_9H_{10})_2ZrCl_2$), was purchased from Albemarle Corporation, Baton Rouge, La.

The bridged, asymmetrically substituted bulky ligand metallocene-type compound, dimethylsilyl (1,2,3,4-tetramethyl-cyclopentadienyl)(3-methyl-cyclopentadienyl) zirconium dichloride $Me_2Si(\eta^5\text{-}CpMe_4)(\eta^{5-3}MeC_5H_3)ZrCl_2$, was synthesized as follows:

A solution of $Me_4C_5HSiMe_2Cl$ (29.6 g, 0.138 mol) in THF (100 ml) was slowly added to a slurry of $C_5H_4MeLi$ (11.6 g, 0.138 mol) in 200 ml THF. After 1.5 h 2.1 equivalents of nBuLi was added slowly for deprotonation. Pentane (200 ml) was added to the reaction mixture and the white dilithio salt was collected on a glass frit and washed with additional pentane. The dianion, [$Me_2Si(CpMe_4)$ ($3MeC_5H_3$)][$Li_2$], was slurried in $Et_2O$ (500 ml) and reacted with solid $ZrCl_4$ (28.0 g, .122 mol) at room temperature. The volatiles were removed from the reaction mixture after 2 h to yield a yellowish white solid. The crude solid was extracted with $CH_2Cl_2$ (5×100 ml), the extracts were filtered through a medium glass frit, reduced to 150 ml and cooled to −35° C. A yellow-green solid was collected (26.5 g) which was predominantly the 3-Me isomer (95% by $^1H$ NMR).

Comparative Example 1

Catalyst Preparation 100% $Me_2Si(\eta^5\text{-}CpMe_4)(\eta^5\text{-}3MeC_5H_3)ZrCl$ 450 ml of 30% methylalumoxane in toluene was added to a 2 gallon glass reactor vessel with a heating/cooling jacket and a helical ribbon blender having a central auger-type shaft. A suspension of 20.6 g of a bridged, asymmetrically substituted bulky ligand metallocene-type catalyst compound of the invention, $Me,Si(\eta^5\text{-}CpMe_4)(\eta^5\text{-}3MeC_5H_3)ZrCl_2$, in 834 ml toluene was transferred into the reactor vessel via a cannula. An additional 2250 ml toluene was added to the reactor vessel and the solution stirred for 1 hr. The mixture was removed from the reactor to a large glass flask and 895.2 g of silica gel (MS948, 1.65 cc/g P. V., available from W.R. Grace, Davison Chemical Division, Baltimore, Md.) was added to the reactor vessel. The activated metallocene solution was then added back to the reactor vessel and stirred for 20 min. A solution of surface modifier AS-990 (N,N-bis(2-hydroxylethyl)octadecylamine ($Cl_{18}H_{37}N(CH_2CH_2OH)_2$)) available as Kemamine AS-990 from ICI Specialties, Wilmington, Del.), in amount of 6.4 g in 163 ml of toluene was then added to the reaction vessel and stirring continued for an additional 20 min. The catalyst was dried by purging with a $N_2$ stream until free-flowing.

Comparative Example 2

Catalyst Preparation for 100% $Me_2Si(C_9H_{10})_2ZrCl_2$ 1250 mL of 30 wt.% aluminoxane in toluene (~0.93 g/mL, 6.01 mol) was added to a two gallon glass walled reactor vessel with a heating/cooling jacket and a helical ribbon blender having a central auger-type shaft. A suspension of 22.50 g dimethylsilyl-bis(tetrahydroindenyl)zirconium dichloride ($Me2Si(H_4Ind)_2ZrCl_2$), a bridged, bulky ligand metallocene-type catalyst compound, in 614 mL toluene was transferred into the reactor vessel via cannula. Next 171 mL toluene was added to the flask that had contained the suspension and any remaining solids were rinsed into the reactor vessel with the toluene. Another 1715 mL toluene was added directly to the reactor vessel and this precursor solution stirred 1 hour. The mixture was removed from the reactor to a large glass flask and 903 g of silica (MS948, 1.65 cc/g P. V., W. R. Grace, Davison Chemical Division, Baltimore, Md.) added to the reactor vessel. The precursor solution was added back to the reactor vessel and stirred 20 min, after which 6.4 g of surface modifier AS-990 (N,N-bis (2-hydroxylethyl) octadecylamine (($C_{18}H_{37}N(CH_2CH_2OH)$)$_2$) is available as Kemamine AS-990 from ICI Specialties, Wilmington, Del.) in about 70 mL toluene was added and stirring continued another 20 min. Drying was then begun by gradually evacuating the system to >27 in Hg vacuum while feeding a small stream of $N_2$ into the bottom of the reactor with heating and stirring. After 7.5 hr 1293 g of free flowing, dry material was unloaded from the reactor vessel under $N_2$ pressure.

Polymerization Process for Comparative Examples 1 and 2

The catalyst systems of Comparative Examples 1 and Comparative Examples 2 were then tested in a continuous gas phase fluidized bed reactor which comprised a nominal 18 inch, schedule 60 reactor having an internal diameter of 16.5 inches. The fluidized bed is made up of polymer granules. The gaseous feed streams of ethylene and hydrogen together with liquid comonomer were mixed together in a mixing tee arrangement and introduced below the reactor bed into the recycle gas line. Hexene-1 was used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream. The catalyst system was injected directly into the fluidized bed using purified nitrogen as a carrier. Its rate was adjusted to maintain a constant production rate. The reacting bed of growing polymer particles is maintained in a fluidized state by the continuous flow of the make up feed and recycle gas through the reaction zone. A superficial gas velocity of 1–3 ft/sec was used to achieve this. The reactor was operated at a total pressure of 300 psig. To maintain a constant reactor temperature, the temperature of the recycle gas is continuously adjusted up or down to accommodate any changes in the rate of heat generation due to the polymerization. The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

The polymerization conditions for each polymerization utilizing the catalyst systems of Comparative Example 1 and 2 and results are set forth in Table 1.

TABLE 1

| Comparative Example | Comparative Example 1 | Comparative Example 2 |
|---|---|---|
| Temperature (° F.) (° C.) | 175.1 (79.5) | 185 (85) |
| Pressure (psi) (kPa) | 300 (2069) | 300 (2069) |
| $C_2$ Partial Pressure (psia) (kPa) | 156.7 (1080) | 157.2 (1084) |
| Ethylene (mole %) | 49.9 | 50 |
| Hydrogen (mole ppm) | 553.2 | 569 |
| Hydrogen/Ethylene Concentration ratio | 11.08 | 11.39 |
| Hexene (mole %) | 1.07 | 0.49 |
| Hexene/Ethylene Concentration ratio | 0.0214 | 0.0099 |
| Bed Weight (lbs) (Kg) | 296.8 (135) | 269 (122) |
| Residence Time (hrs) | 4.34 | 4.32 |
| Gas Velocity (ft/sec) (cm/sec) | 2.25 (68.6) | 2.25 (68.6) |
| Production Rate (lbs/br) (Kg/Hr) | 69.3 (31.4) | 62.4 (28.3) |
| Bulk Density (g/cc) | 0.4121 | 0.4491 |

Comparative Example 3

In this Comparative Example 3 a physical blend ratio of 75 percent of the polymer produced using the polymer produced using the catalyst system of Comparative Example 1 (Polymerization Process CEx 1) and 25 percent of the polymer produced using the catalyst system of Comparative Example 2 (Polymerization Process CEx 2). The resulting polymer blend had a density of 10 0.919 g/cc, a melt index of 0.88 dg/min and a MIR of51. See Table 3, CEx 3 for more results.

Comparative Example 4

In this Comparative Example 3 a physical blend ratio of 50 percent of the polymer produced using the polymer produced using the catalyst system of Comparative Example 1 (Polymerization Process CEx 1) and 50 percent of the polymer produced using the catalyst system of Comparative Example 2 (Polymerization Process CEx 2). The resulting polymer blend had a density of 0.919 g/cc, a melt index of 0.87 dg/min and a MIR of 49. See Table 3, CEx 4 for more results.

Comparative Example 5

In this Comparative Example 5 a physical blend ratio of 25 percent of the polymer produced using the polymer produced using the catalyst system of Comparative Example 1 (Polymerization Process CEx 1) and 75 percent of the polymer produced using the catalyst system of Comparative Example 2 (Polymerization Process CEx 2). The resulting polymer blend had a density of 0.918 g/cc, a melt index of 0.87 dg/min and a MIR of 47. See Table 3, CEx 5 for more results.

Example 6

Catalyst Preparation for a 50/50 (mole %) codeposit of a metallocene mixture of $Me_2Si$ $(\eta^5 CpMe_4)(\eta^5-3MeC_5H_3)ZrCl_2/Me_2Si(C_9H_{10})_2ZrCl_2$ To a solid mixture of $Me_2Si(^5-CpMe_4)(\eta^5-3MeC_5H_3)ZrCl_2$ (0.37 g, 8.22 mmol) and $Me_2Si(C_9H_{10})_2ZrCl_2$ (0.37 g, 8.22 mmol) was added methylalumoxane (MAO) (48.5 g, 30% in toluene) and toluene (48.5 g) and the mixture was stirred until dissolution (10 min). Silica gel (36.3 g) is poured into the reaction mixture and mixed with a spatula. The wet solid is transferred to a glass bulb and dried in vacuo at room temperature for 15 h. It is transferred to a metal bomb for screening in lab gas phase reactor. Polymerization conditions are set forth in Table 2 and polymer properties are set forth in Table 3.

Example 7

Catalyst Preparation for a 65/35 (mole %) codeposit of a metallocene mixture of $Me_2Si(\eta^5-CpMe_4)(\eta^5-3MeC_5H_3)ZrCl_2/Me_2Si(C_9H_{10})_2ZrCl_2$ To a solid mixture of $Me_2Si(\eta^5-CpMe_4)(\eta^5-3MeC_5H_3)ZrCl_2$ (0.44 g, 1.07 mmol) and $Me_2Si(C_9H_{10})_2ZrCl_2$ (0.26 g, 0.57 mmol) was added methylalumoxane (MAO) (53.5 g, 30% in toluene) and toluene (54.0 g) and the mixture was stirred until dissolution (10 min). Silica gel (40.0 g) is poured into the reaction mixture and mixed with a spatula. The wet solid is transferred to a glass bulb and dried in vacuo at room temperature for 15 h. It is transferred to a metal bomb for screening in lab gas phase reactor. Polymerization conditions are set forth in Table 2 and polymer properties are set forth in Table 3.

Example 8

Catalyst Preparation for 75/25 (mole %) codeposit of a mixed metallocene of $Me_2Si(\eta^5-CpMe_4)(\eta^5-3MeC_5H_3)ZrCl_2/Me_2Si(C_9H_{10})_2ZrCl_2$ To a solid mixture of $Me_2Si(\eta^5-CpMe_4)(\eta^5-3MeC_5H_3)ZrCl_2$ (0.51 g, 1.23 mmol) and $Me_2Si(C_9H_{10})_2ZrCl_2$ (0.19 g, 0.41 mmol) was added methylalumoxane (MAO) (48.5 g, 30% in toluene) and toluene (48.5 g) and the mixture was stirred until dissolution (10 min). Silica gel (36.3 g) is poured into the reaction mixture and mixed with a spatula. The wet solid is transferred to a glass bulb and dried in vacuo at room temperature for 15 h. It is transferred to a metal bomb for screening in lab gas phase reactor. Polymerization conditions are set forth in Table 2 and polymer properties are set forth in Table 3.

Example 9

Catalyst Preparation of a 75/25 (mole percent) physical mixture of a supported $Me_2Si(\eta^5-CpMe_4)$ $(\eta^5-3MeC_5H_3)ZrCl_2$ and a supported $Me_2Si(C_9H_{10})ZrCl_2$ Example 9A To a solid mixture of $Me_2Si(C_9H_{10})_2ZrCl_2$ (0.37 g, 0.81 mmol) was added methylalumoxane (MAO) (24.2 g, 30% in toluene) and toluene (24.2 g) and the mixture was stirred until dissolution (10 min). Silica gel (18.2 g) is poured into the reaction mixture and mixed with a spatula. The wet solid is transferred to a glass bulb and dried in vacuo at room temperature for 15 h to form a supported $Me_2Si(C_9H_{10})_2ZrCl_2$.

Example 9B

To a solid mixture of $Me_2Si(\eta^5\text{-}CpMe_4)(\eta^5\text{-}3MeC_5H_3)ZrCl_2$ (1.62 g, 3.87 mmol) was added methylalumoxane (MAO) (108.1 g, 30% in toluene) and toluene (108.1 g) and the mixture was stirred until dissolution (10 min). Silica gel (80.0 g) is poured into the reaction mixture and mixed with a spatula. The wet solid is transferred to a glass bulb and dried in vacuo at room temperature for 15 h to form a supported $Me_2Si(\eta^5\text{-}CpMe_4)(\eta^5\text{-}3MeC_5H_3)ZrCl_2$

Example 9C 13.8 g of the supported catalyst of Example 9A was then blended together with 37.2 g of the supported catalyst of Example 9B before loading into a metal bomb. The mixed supported catalysts were then transferred to a metal bomb for testing in a lab gas phase reactor. Polymerization conditions are set forth in Table 2 and polymer properties are set forth in Table 3.

TABLE 2

| Example | Example 6 | Example 7 | Example 8 | Example 9C |
|---|---|---|---|---|
| Temperature (° F.) (° C.) | 175 (79.4) | 175 (79.4) | 165 (73.9) | 174 (78.9) |
| Pressure (psi) | 300 (2067) | 300 (2067) | 300 (2067) | 300 (2067) |
| Hydrogen Flow (sccm) | 1.57 | 5.37 | 0.09 | 0 |
| Ethylene (mole %) | 29.8 | 34.8 | 24.8 | 24.9 |
| Hydrogen (mole ppm) | 257 | 351 | 217 | 199 |
| Hydrogen/Ethylene Concentration ratio | 8.6 | 10.1 | 8.7 | 8.0 |
| Hexene (mole %) | 0.33 | 0.38 | 0.30 | 0.32 |
| Hexene/Ethylene Concentration | 0.011 | 0.08 | 0.012 | 0.013 |
| Bed Weight (g) | 1912 | 2277 | 1664 | 1905 |
| Residence Time (hrs) | 4.1 | 3.9 | 4.7 | 6.0 |
| Catalyst Productivity (g/g) | 2218 | 2269 | 1537 | 1120 |
| Gas Velocity (ft/sec) (cm/sec) | 1.60 (48.8) | 1.60 (48.8) | 1.58 (48.2) | 1.58 (48.2) |
| Production Rate (g/hr) | 462 | 590 | 356 | 315 |
| Bulk Density (g/cc) | 0.4755 | 0.4603 | 0.4443 | 0.4163 |

TABLE 3

| | Comparative Example 1 | Comparative Example 2 | Comparative Example 3 | Comparative Example 4 | Comparative Example 5 | Example 6 | Example 7 | Example 8 | Example 9 |
|---|---|---|---|---|---|---|---|---|---|
| Density (g/cc) | 0.9192 | 0.9180 | 0.9188 | 0.9187 | 0.9183 | 0.9209 | 0.9229 | 0.9195 | 0.9199 |
| MI (dg/min) | 0.88 | 0.87 | 0.88 | 0.87 | 0.87 | 0.87 | 0.95 | 1.29 | 2.20 |
| MIR | 54.4 | 42.7 | 50.8 | 49.0 | 46.6 | 65.5 | 60.8 | 50.9 | 34.7 |
| Die Swell | 1.38 | 1.17 | 1.38 | 1.37 | 1.31 | 1.21 | 1.21 | 1.32 | 1.42 |
| Melt Strength (cN) | 9.9 | 6.5 | 9.8 | 8.7 | 8.0 | 6.1 | 6.4 | 6.4 | 6.3 |
| Break Speed (cm/s) | 50.3 | 49.3 | 49.0 | 52.0 | 52.7 | 56.0 | 54.0 | 51.7 | 54.7 |
| $M_n$ | 18,600 | 19,600 | 18,900 | 17,500 | 19,900 | 23,000 | 20,400 | 16,400 | 17,100 |
| $M_w$ | 128,500 | 94,300 | 125,100 | 117,800 | 103,100 | 104,600 | 114,100 | 123,600 | 110,500 |
| $M_z$ | 514,800 | 229,100 | 492,600 | 428,700 | 317,900 | 284,700 | 337,200 | 436,800 | 414,700 |
| Mp | 48,800 | 62,900 | 53,700 | 54,000 | 52,600 | 50,100 | 50,800 | 55,500 | 54,800 |
| $M_w/M_n$ | 6.91 | 4.81 | 6.62 | 6.73 | 5.18 | 4.55 | 5.59 | 7.54 | 6.46 |
| $M_z/M_w$ | 4.01 | 2.43 | 3.94 | 3.64 | 3.08 | 2.72 | 2.96 | 3.53 | 3.75 |
| CDBI (%) | 76.4 | 85.9 | 77.2 | 81.0 | 81.7 | Not Measured | Not Measured | 70.6 | 68.9 |

Lab Gas Phase Polymerizations for Examples 6 through 9

All the catalysts prepared in Examples 6 through 9 were screened in a fluidized bed reactor equipped with devices for temperature control, catalyst feeding or injection equipment, GC analyzer for monitoring and controlling monomer and gas feeds and equipment for polymer sampling and collecting.

The reactor consists of a 6' diameter bed section increasing to 10' at the reactor top. Gas comes in through a perforated distributor plate allowing fluidization of the bed contents and polymer sample is discharged at the reactor top.

From Table 3 you can see that, at a fairly comparable MI, the mixed catalyst system of the invention produces polymer products having Melt Index Ratio values higher than each polymer produced separately by each of the different bridged metallocene-type catalysts of the invention (Comparative Examples 1 and 2), than various physical blends of the polymers produced from each bridged metallocene-type catalyst separately (Comparative Examples 3 through 5). Examples 6 and 7 clearly illustrate the higher MIR values using the mixed bridged, bulky ligand metallocene-type catalysts of the invention. Examples 8 and 9 have significantly higher MI's than the comparative examples, their advantage in MIR is best illustrated in FIG. 1 where the MI dependence of MIR is shown.

Comparative Examples 10 and 11

The product of Comparative Example 10 was produced using the same bridged, asymmetrically substituted bulky ligand metallocene-type catalyst compound, Me$_2$Si($\eta^5$-CpMe$_4$)($\eta^5$-3MeC$_5$H$_3$)ZrCl$_2$, as described and prepared in Comparative Example 1. The supported catalyst system of Comparative Example 10 was tested in a lab gas phase polymerization process similar to that described above. The polymer results are set forth in Table 4 below.

The product of Comparative Example 11 was produced using the same bridged, bulky ligand metallocene-type catalyst compound, Me$_2$Si(H$_4$Ind)$_2$ZrCl$_2$), as described and prepared in Comparative Example 2. The supported catalyst system of Comparative Example 11 was tested in a lab gas phase polymerization process similar to that described above. The polymer results are set forth in Table 4 below.

Examples 12 through 14

The product of Example 12 was produced using the same mixed bridged metallocene-type catalysts compounds in the same proportions as described and similarly prepared as in Example 6 above. The supported catalyst system of Example 12 was tested in a lab gas phase polymerization process similar to that described above. The polymer results are set forth in Table 4 below.

The product of Example 13 was produced using the same mixed bridged metallocene-type catalysts compounds in the same proportions as described and similarly prepared as in Example 7 above. The supported catalyst system of Example 13 was tested in a lab gas phase polymerization process similar to that described above. The polymer results are set forth in Table 4 below.

The product of Example 14 was produced using the same mixed bridged metallocene-type catalysts compounds in the same proportions as described and similarly prepared as in Example 7 above. The supported catalyst system of Example 14 was tested in a lab gas phase polymerization process similar to that described above. The polymer results are set forth in Table 4 below.

TABLE 4

| | Comparative Example 10 | Comparative Example 11 | Example 12 | Example 13 | Example 14 |
|---|---|---|---|---|---|
| Density (g/cc) | 0.9217 | 0.9192 | 0.9214 | 0.9233 | 0.9231 |
| MI (dg/min) | 1.69 | 1.18 | 0.90 | 1.14 | 1.49 |
| MIR | 36.4 | 34.3 | 54.9 | 55.9 | 50.6 |
| Die Swell | 1.47 | 1.27 | 1.27 | 1.25 | 1.30 |
| Melt Strength (cN) | 8.5 | 5.7 | 7.5 | 5.9 | 6.3 |
| Break Speed (cm/s) | 46.7 | 44.3 | 55.0 | 56.0 | 53.0 |
| CDBI (%) | Not Measured | Not Measured | Not Measured | Not Measured | 68.3 |

The following FIG. 1 is a graph of the MIR versus Melt Index data from Tables 3 and 4. Note that the resulting polymers produced by the mixed bridged, metallocene-type catalyst systems of the inventions (including Example 9) have a higher MIR at a given MI.

While the present invention has been described and illustrated by reference to particular embodiments, those of ordinary skill in the art will appreciate that the invention lends itself to variations not necessarily illustrated herein. For example the mixed bridged metallocene-type catalyst systems of the invention may be mixed with an unbridged bulky ligand metallocene-type catalyst compound that may be optionally asymmetrically substituted. It is also contemplated that this mixed bridged metallocene-type catalyst compounds of the invention can be used separately or together in a series reactor process. For this reason, then, reference should be made solely to the appended claims for purposes of determining the true scope of the present invention.

We claim:

1. A process for polymerizing olefin(s) in the presence of a mixed catalyst system comprising at least two different metallocene compounds, the mixed catalyst system comprising a bridged, bulky ligand metallocene catalyst compound and a bridged, asymmetrically substituted, bulky ligand metallocene catalyst compound and at least one activator.

2. The process in accordance with claim 1 wherein the mixed catalyst system further comprises a carrier.

3. The process in accordance with claim 1 wherein the mixed catalyst comprises from 5 to 95 mole percent of the bridged, bulky ligand metallocene catalyst compound to from 95 to 5 mole percent of the bridged, asymmetrically substituted bulky ligand metallocene catalyst compound based on the total mole percent of the bridged, bulky ligand metallocene catalyst compound and the bridged, asymmetrically substituted, bulky ligand metallocene catalyst compound.

4. The process in accordance with claim 1 wherein the bridged, bulky ligand metallocene catalyst compound is represented by the formula:

$(C_5H_{4-d}R_d)A(C_5H_{4-d}R_d)MQg_{-2}$ wherein M is a Group 4, 5, 6 transition metal, $(C_5H_{4-d}R_d)$ is an unsubstituted or substituted cyclopentadienyl derived bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of carbon, germanium, silicon, tin, phosphorous or nitrogen atom containing radical bridging two $(C_5H_{4-d}R_d)$ ligands; each Q which can be the same or different is a hydride, substituted or unsubstituted hydrocarbyl radical having from 1 to 30 carbon atoms, halogen, alkoxide, aryloxide, amide, phosphide, or any other univalent anionic ligand or combination thereof; optionally, two Q's together form an alkylidene ligand or cyclometallated hydrocarbyl ligand or other divalent anionic chelating ligand, where g is an integer corresponding to the formal oxidation state of M, d is an integer selected from the 0, 1, 2, 3 or 4 and denoting the degree of substitution; and d is the same integer for each $(C_5H_{4-d}R_d)$ ligand.

5. The process in accordance with claim 1 wherein the bridged, asymmetrically substituted bulky ligand metallocene catalyst compound is represented by the formula:

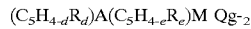

$(C_5H_{4-d}R_d)A(C_5H_{4-e}R_e)M\ Qg_{-2}$ wherein M is a Group 4, 5, 6 transition metal, $(C_5H_{4-d}R_d)$ and $(C_5H_{4-e}R_e)$ are unsubstituted or substituted cyclopentadienyl derived bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of carbon, germanium, silicon, tin, phosphorous or nitrogen atom containing radical bridging $(C_5H_{4-d}R_d)$ and $(C_5H_{4-e}R_e)$ ligands; each Q which can be the same or different is a hydride, substituted or unsubstituted hydrocarbyl radical having from 1 to 30 carbon atoms, halogen, alkoxide, aryloxide, amide, phosphide, or any other univalent anionic ligand or combination thereof; optionally, two Q's together form an alkylidene ligand or cyclometallated hydrocarbyl ligand or other divalent anionic chelating ligand, where g is an integer corresponding to the formal oxidation state of M, d and e are integers selected from 0, 1, 2, 3 or 4 and denoting the degree of substitution; and d and e are a different integer.

6. A process for polymerizing olefin(s) using a supported mixed catalyst comprising (1) at least two different bridged, bulky ligand metallocene catalyst compounds, wherein one bulky ligand metallocene catalyst compound is asymmetrically substituted; and (2) a carrier.

7. The process of claim 6 wherein said supported mixed catalyst further comprises an activator.

8. A process for polymerizing olefin(s) in the presence of a mixed catalyst system to produce a polymer product having a melt index ratio (MIR) satisfying the following formula MIR≧0.95[58.352–63.498(log(MI))], where MI is the melt index measured by ASTM-D-1238-E, the mixed catalyst system comprising a bridged, bulky ligand metallocene catalyst compound, a bridged, asymmetrically substituted bulky ligand metallocene catalyst compound, and an activator.

9. The process in accordance with claim 8 wherein the mixed catalyst system is supported on a carrier.

10. The process in accordance with claim 8 wherein the polymer product has a MIR greater than or equal to about [58.352–63.498(log(MI))] and a density in the range of from 0.85 g/cc to about 0.950 g/cc.

11. The process in accordance with claim 8 wherein the mixed catalyst system comprises from 10 to 90 mole percent of the bridged, bulky ligand metallocene catalyst compound to from 90 to 10 mole percent of the bridged, asymmetrically substituted bulky ligand metallocene catalyst compound based on the total mole percent of the bridged, bulky ligand metallocene catalyst compound and the bridged, asymmetrically substituted, bulky ligand metallocene catalyst compound.

12. The process of claim 8 wherein the Melt index (MI) of the polymer product from about 0.1 dg/min to about 20 dg/min.

13. A process for polymerizing olefin(s) to produce a polymer product in the presence of a mixed catalyst system comprising an activator and at least two bridged, bulky ligand metallocene compounds wherein at least one of the compounds comprises at least two asymmetrically substituted bulky ligands and the other compound comprising at least two symmetrically substituted bulky ligands.

14. The process of claim 13 wherein said mixed catalyst system further comprises a carrier.

15. The process in accordance with claim 13 wherein the polymer product has a MIR greater than or equal to about [58.352–63.498(log(MI))] and a density in the range of from 0.85 g/cc to about 0.950 g/cc.

16. The process in accordance with claim 14 wherein the polymer product has a MIR greater than or equal to about 0.95 [58.352–63.498(log(MI))].

17. The process in accordance with claim 14 wherein the polymer product has a MI in the range of from 0.1 dg/min to about 3 dg/min.

18. The process in accordance with claim 16 wherein the process is producing a polymer product having a density greater than 0.910 g/cc to about 0.930 g/cc and a MI in the range of from 0.1 dg/min to about 3 dg/min.

19. The process in accordance with claim 18 wherein the polymer product has a Composition Distribution Breadth Index greater than 60%, a $M_w/M_n$ in the range of from 4 to 8 and a density in the range of from 0.915 g/cc to 0.930 g/cc.

20. The process in accordance with claim 13 wherein the process is a gas phase or slurry polymerization process.

21. The process in accordance with claim 14 wherein the process is a gas phase polymerization process.

22. A process for polymerizing olefins to produce a polymer product in the presence of a mixed catalyst comprising a metallocene catalyst activator and at least two different metallocenes, two metallocenes each metallocene being bridged to each other, and wherein the at least two metallocenes each comprise a transition metal, which is the same or different, from Group 3 to 7 or a metal of the Lanthanide or Actinide Series of the Periodic Table of Elements, wherein at least one metallocene comprises at least two bridged bulky ligands, the number of non-hydrogen substituents, said substituents being the same or different on each of the bulky ligands, being from 0 to 4, said number being the same; the number of substituents on each of the bulky ligands of the at least one other metallocene being different , the bulky ligands are the same and the substituents are the same or different.

23. The process of claim 22 wherein the mixed catalyst comprises from 2 to 98 mole percent of the one metallocene and from 98 to 2 mole percent of the at least one other metallocene based on the total mole percent of the one metallocene and the one other metallocene.

24. The process of claim 22 wherein the mixed catalyst comprises from 5 to 95 mole percent of the one metallocene and form 95 to 5 mole percent of the at least one other metallocene based on the total mole percent of the one metallocene and the one other metallocene.

25. The process of claim 22 wherein the mixed catalyst further comprises a carrier.

26. The process of claim 22 wherein the one metallocene compound is represented by the formula:

$(C_5H_{4-d}R_d)A(C_5H_{4-d}R_d)MQ_{g-2}$ wherein M is a Group 4,5 or 6 transition metal, $(C_5H_{4-d}R_d)$ is an unsubstituted or substituted cyclopentadienyl containing bulky ligand bonded to M, each R, which is the same or different, is hydrogent or a substituent group containing up to 50 non-hydrogen atoms or substitued or unsubstitued hydrocarbyl having from 1 to 30 carbon atoms or cambinations thereof, or two or more carbon atoms are joined together to form a part of a substituted or unsubstituted ring or ring system having 4 to 30 carbon atoms, A is one or more of, or a combination of a carbon, germanium, silicon, tin, phosphorous or nitrogen atom containing radical bridging between the two $(C_5H_{4-d}R_d$ligands; each Q which is the same or different is a hydride, substituted or unsubstituted hydrocarbyl radical having from 1 to 30 carbon atoms, halogen, alkoxide, aryloxide, amide, phosphide, a univalent anionic ligand or combination thereof; optionally, two Q's together from a alkylidene ligand or cyclometallated hydrocarbyl ligand or other divalent anionic chelating ligand, where g is an integer corresponding to the formal oxidation state of M, d is an integer from 0, 1, 2, 3 or 4; and d is the same integer for each $(C_5H_{4-d}R_d)$ ligand.

27. The process of claim 26 wherein the integer d is 0 or 2.

* * * * *